United States Patent Office 3,281,664
Patented Oct. 25, 1966

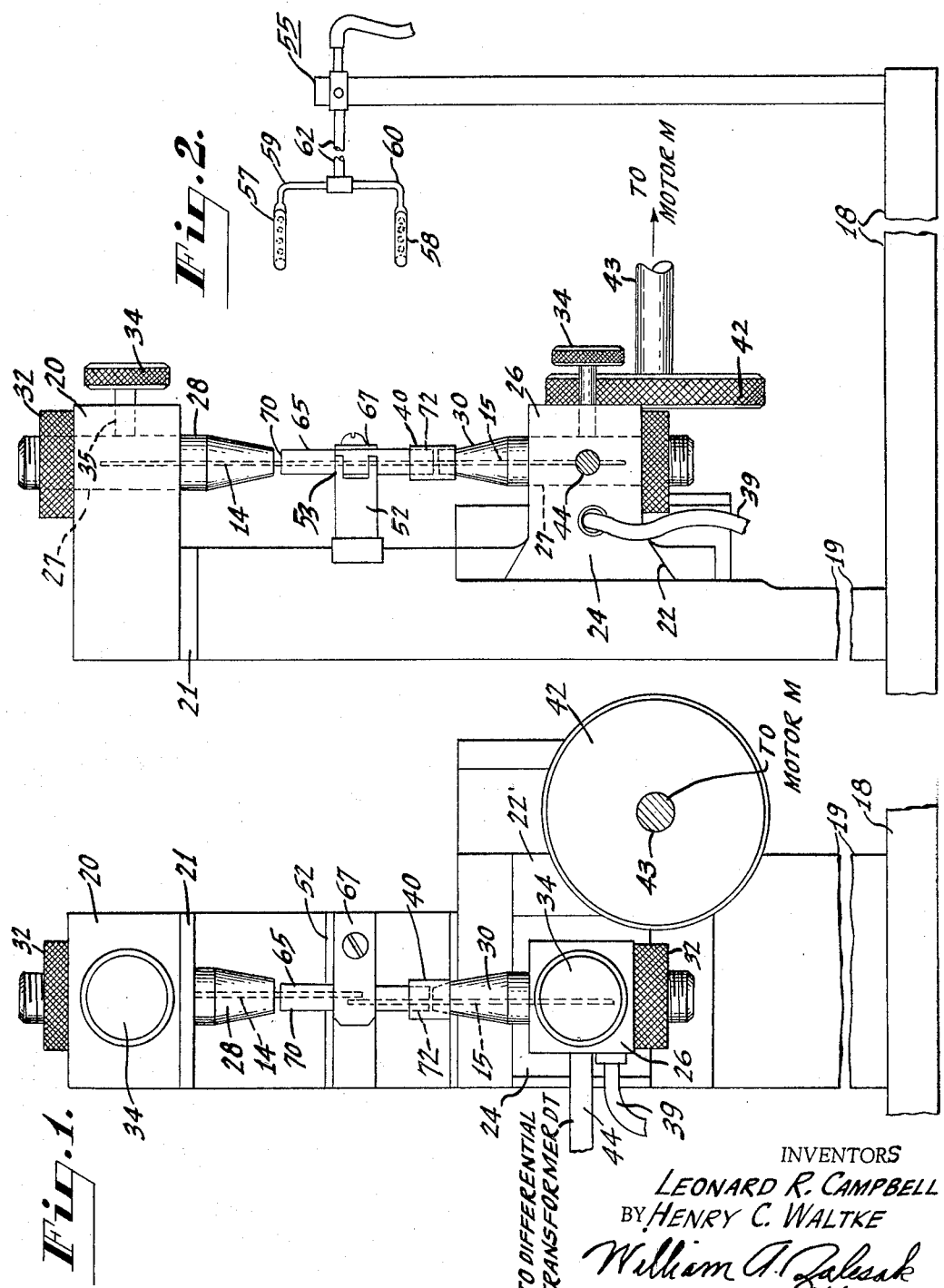

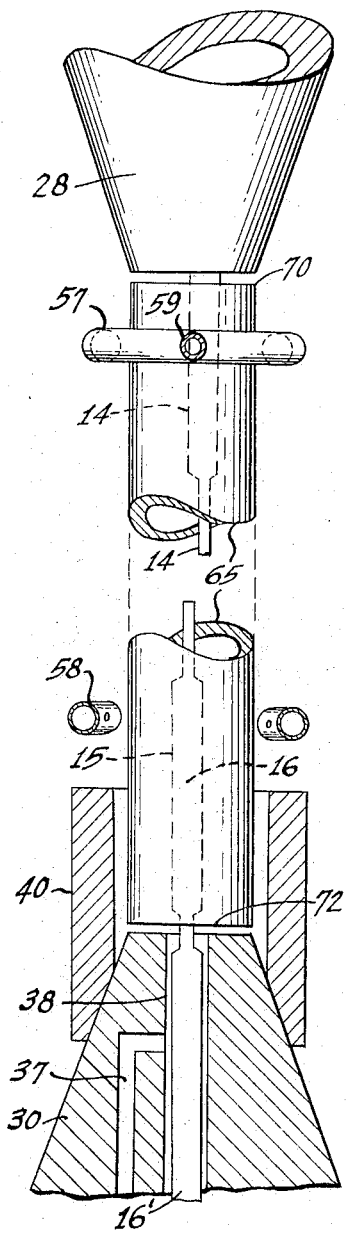
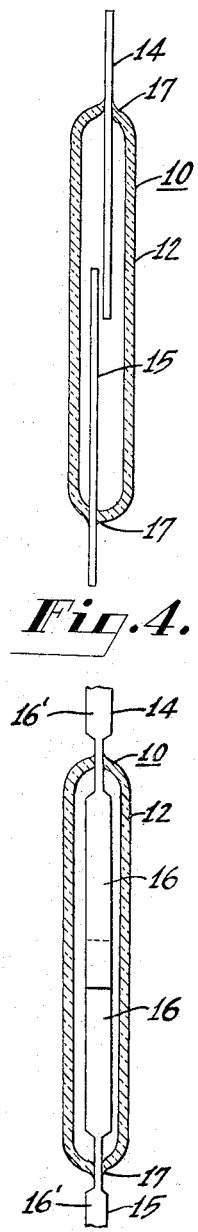
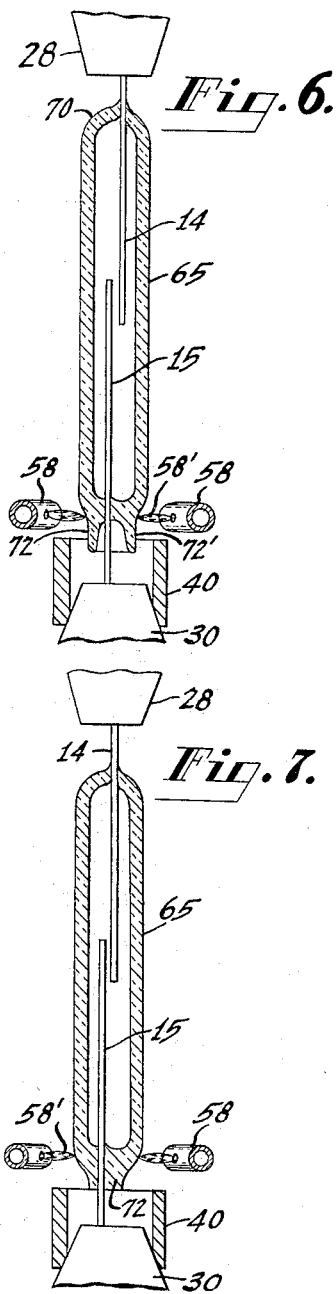
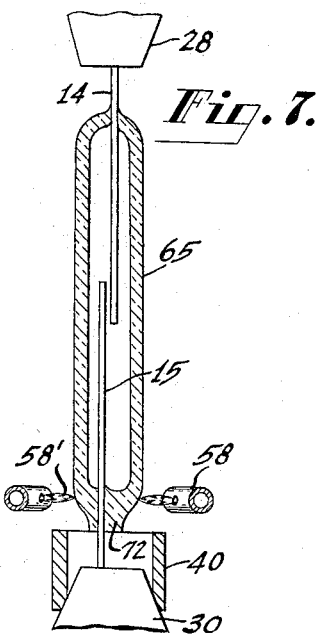
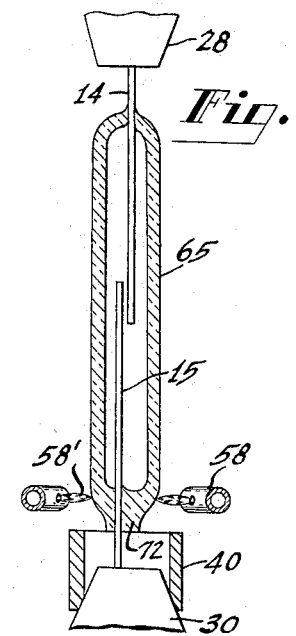

3,281,664
APPARATUS FOR FABRICATING REED SWITCHES WITH MEANS TO AUTOMATICALLY SET THE GAP TO A PRESELECTED VALUE
Leonard R. Campbell, New Brunswick, and Henry C. Waltke, New Providence, N.J., assignors to Radio Corporation of America, a corporation of Delaware
Filed Dec. 17, 1963, Ser. No. 331,311
5 Claims. (Cl. 324—28)

This invention relates to the manufacture of reed switches and particularly to an apparatus for fabricating glass reed switches having uniformly and accurately positioned reeds.

A known type of reed switch comprises a pair of reeds of magnetic material projecting into a tube, usually of glass. The outer ends of the reeds project through and are sealed vacuum tight through opposite end walls of the glass tube to serve as terminals of the switch. Within the glass tube, the two reeds are positioned in overlapped, spaced apart relation.

The reeds are generally thin and resilient. The switches are operated by applying a magnetic field thereto of a strength sufficient to cause the overlapping portions of the magnetic reeds to contact one another. In proper operation of such switches the reeds contact one another in response to a magnetic field of preselected strength, and the reeds spring apart on collapse of the field. To assure response of the switches in a contacting movement to such preselected magnetic field strength, the spacing or gap between the reeds is accurate to a fine degree. In one type of reed switch to which this invention has particular application, for example, the gap between the reeds is controlled to within two ten-thousandths of an inch (.0002 inch).

The method of manufacturing reed switches generally comprises positioning a pair of reeds in overlapped relation within an open ended glass tube. The gap between the reeds is carefully set and the ends of the glass tube are sealed onto the reeds.

According to one recently developed method, the gap setting of the reeds is performed by first moving the reeds into contact with one another to complete an electrical circuit. Then the reeds are moved apart to a point where the electrical circuit is first broken to provide a reference or indicia point from which measurement may be made. Thereafter, the reeds are moved a preselected distance away from the reference point to provide the correct gap or spacing between the reeds. An advantage of this method is that the spacing between the reeds is independent of any bow or distortion of the reeds. Measurement from the indicia point provides a "true" spacing with respect to the magnetic and electrical characteristics of the reeds.

In the past, the reed gap setting operation was done manually. Such manual operation comprises, for example, mounting each of the reeds in a different chuck so that the reeds are disposed in spaced apart, overlapped relation. One of the chucks is movable with respect to the other. The operator first moves the movable chuck in a direction to cause the reeds to contact one another and to complete an electrical circuit as indicated by the passage of current through an ammeter connected in series with the reeds. The movable chuck is then moved in the opposite direction to a point where the electrical current between the reeds is first broken as indicated by the interruption of current flow through the ammeter. This point provides the reference or indicia point from which measurement is made. By means of a suitable measuring device, such as a dial indicator gage, the position of the movable chuck at this point is noted by the operator. Thereafter, the movable chuck is moved a preselected distance away from the reference point, as determined by reference to the measuring device, to set the correct gap between the reeds.

It is an object of this invention to provide novel apparatus for performing the reed gapping operation automatically.

In one embodiment of this invention, apparatus is provided which may comprise a pair of chucks adapted to receive and position the reeds in overlapped relation, one of the chucks being movable with respect to the other. Means are provided for mounting a glass tube in proper surrounding relation with the reeds and for sealing the ends of the glass tube onto the reeds after the gap between the reeds has been set.

Briefly, the apparatus of the invention for automatically setting the gap between the reeds includes a reversible motor connected to move a movable chuck towards and away from a stationary chuck. Also connected to the movable chuck is a signal producing means operable to produce a D.C. voltage which is dependent upon the position of the movable chuck and which is proportional to the movement of the movable chuck. Connected in series with the output of the signal producing means is a capacitor. Means are provided for charging the capacitor to the output voltage of the signal producing means, but with reverse polarity, during the time the reeds are in electrical contact with one another, and for holding the voltage on the capacitor without change during the time when the reeds are not in electrical contact with one another. Additional means are provided which are responsive to the sum of the voltages across the capacitor and the output of the signal producing means and which are operable to discontinue operation of the motor when the sum voltage reaches a preselected value corresponding to the desired spacing between the reeds.

In the drawings:

FIG. 1 is a front elevational view of a reed switch fabricating apparatus, portions of the apparatus not being shown for clarity;

FIG. 2 is a side elevation of the apparatus shown in FIG. 1;

FIG. 3 is an enlarged view of a portion of the apparatus shown in FIG. 1, portions thereof being broken away;

FIG. 4 is a sectional view of a glass reed switch that may be made using the apparatus of this invention;

FIG. 5 is a side elevation in section of the reed switch shown in FIG. 4;

FIGS. 6 and 7 are enlarged views partially in section of a portion of the apparatus shown in FIG. 1 showing steps in the sealing of the movable reed through the glass envelope; and, FIG. 8 illustrates schematically a preferred embodiment of this invention which may be used in connection with the apparatus shown in FIGS. 1–3 for fabricating reed switches.

Figure 8:
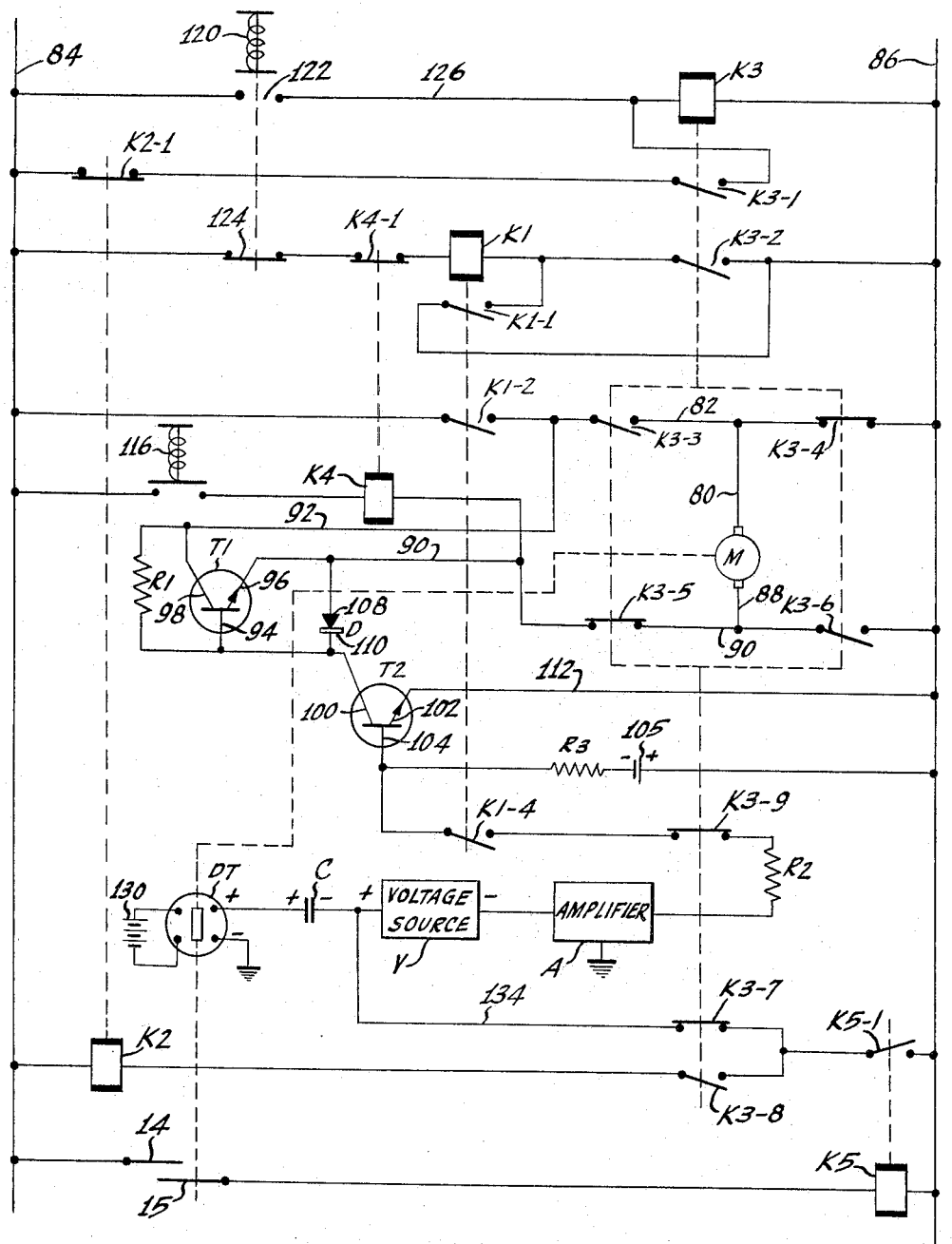

Referring first to FIGS. 4 and 5, a reed switch 10 comprises a glass envelope 12 into which extend a pair of elongated electrical connectors or reeds 14 and 15 made of magnetic material such as a gold plated nickel-iron alloy. The reeds are formed from wire stock flattened at one end 16 to provide contacting portions between the reeds, and flattened at the other end 16' to provide terminals for the reed switch 10. The reeds 14 and 15 extend through glass-to-metal seals 17 at the ends of the envelope 12. The inner ends of the reeds 14 and 15 are close enough together so that a magnetic field of preselected strength when applied to the reed switch 10 by a surrounding coil (not shown) will cause the reeds to contact each other. Within the glass envelope 12 is a protective non-corrosive atmosphere such as nitrogen or hydrogen.

Apparatus which may be employed in making the reed switches 10 is shown in FIGS. 1 and 2. A stationary base 18 is provided on which a vertical standard 19 is fixed. An electrically conductive clamp 20 is fixed to vertical standard 19 at the upper portion thereof, an insulator block 21 being provided to electrically insulate clamp 20 from standard 19. A horizontally extending dovetail groove 22 is formed in the standard 19 below stationary clamp 20. A dovetail slide 24 slidably fits within dovetail groove 22 and includes as a part thereof an electrically conductive clamp 26. Clamps 20 and 26 have vertically extending openings 27 (FIG. 2) therethrough adapted to receive electrically conductive reed chucks 28 and 30. Chucks 28 and 30 have openings 38 therein similar to each other (only one being shown in FIG. 3) adapted to snugly and accurately receive end portions 16' of the reeds 14 and 15, respectively. One end of each chuck 28 and 30 (see FIGS. 1 and 2) is threaded and has a nut 32 thereon. The vertical position of chucks 28 and 30 may thus be controlled with respect to clamps 20 and 26 by means of adjustment of nuts 32. Chucks 28 and 30 are removable from clamps 20 and 26 to facilitate loading of the reeds 14 and 15 therein, and may be clamped securely within clamps 20 and 26 by means of screws 34 threaded into openings 35 in the side of clamps 20 and 26.

Lower chuck 30 (FIG. 3) has a passageway 37 therethrough communicating at one end thereof with the opening 38 in chuck 30, and communicating at its other end with a passageway (not shown) in clamp 26 (FIGS. 1 and 2) communicating in turn with a hose 39 coupled to a source of purging gas (not shown). Valve means (not shown) are also provided for controlling the flow of the purging gas. Mounted on the top end of lower chuck 30 is a tubular shield 40. The purpose of shield 40 will appear hereinafter.

Slide 24, clamp 26, and chuck 30 mounted on clamp 26 are slidable within dovetail groove 22. Movement of slide 24 in either direction is provided by means of a reversible motor (indicated in FIG. 2 and designated "M" in FIG. 8). The armature of the motor M is connected to shaft 43 connected to wheel 42 (FIG. 2). Wheel 42 is connected through suitable gearing means (not shown) to effect sliding motion of slide 24 to the right and left, as viewed in FIG. 1, within dovetail groove 22. A rod 44 (FIG. 1) is mounted on and extends horizontally outwardly from clamp 26. Rod 44 is secured to the armature of a differential transformer (indicated in FIG. 1 and designated "DT" in FIG. 8).

A commercially available differential transformer, (such as the commercially available type designated as 7DCDT050, and manufactured by Sanborn Company) produces a D.C. output voltage which is linearly dependent upon the position of its armature and directly proportional to the amount of linear movement of its armature. Thus, by connecting rod 44 to the armature of the differential transformer, a D.C. output voltage is produced which is directly proportional to the amount of linear movement of slide 24. As described hereinafter, a preselected spacing between the reeds is provided by moving slide 24 in such a direction as to cause a preselected increase in the voltage output of the differential transformer from the voltage output at the point when electrical contact between the reeds is first broken.

A glass tubing support 52 having a V-shape notch 53 along the edge thereof is mounted on standard 19 between clamps 20 and 26. A burner assembly 55 (FIG. 2) comprising a pair of identical annular burners 57 and 58 is held in parallel spaced position by pipings 59 and 60 which supply gas to the two burners 57 and 58. A slidable support 62 is provided for moving the burners 57 and 58 to the left, from the position as viewed in FIG. 2, to the position shown in FIG. 3 where the burners 57 and 58 are disposed around the glass tubing 65 for sealing the tubing, and back to the position shown in FIG. 2 after sealing to remove the sealing flames from the tubing. A sector of each annular burner is omitted thus providing an opening in each burner by means of which the annular burners may be disposed about the glass tubing 65.

As shown in FIGS. 1 and 2, the glass tubing 65 is held in the V-notch 53 of support 52 by spring clip 67. The outer ends of reeds 14 and 15 are individually held in the chucks 28 and 30, respectively, the chucks being secured within clamps 20 and 26. The inner ends of the reeds overlap within the glass tubing 65 (FIG. 1). The position of the tubing 65 is such that the lower end 72 of the tubing (see FIG. 3) is closely adjacent the upper end of lower chuck 30 and is within shield 40, and the upper end 70 is positioned adjacent upper chuck 28.

For controlling motor M for providing the proper backward and forward movements of slide 24, a circuit for use with the apparatus of FIGS. 1–3 is schematically illustrated in FIG. 8. The reversible motor M, as described, has its armature connected by means of shaft 43 to slide 24 (FIG. 2). For convenience, a motor having a permanent magnetic field is used, although other types of motors may be utilized. One terminal 80 of the armature winding of motor M is connected to a conductor 82 which is connected to the positive line 84 of a D.C. power source when the normally open contacts K3–3 and K1–2 of relays K3 and K1, respectively, are closed. The conductor 82 is connected to the negative line 86 of the power source through normally closed contact K3–4 of relay K3. The negative line 86 is grounded. The other terminal 88 of the armature winding of motor M is connected to conductor 90 connected to ground when normally open contact K3–6 of relay K3 is closed. Conductor 90 is connected to the positive power line 84 through normally closed contact K3–5 of relay K3, an N-P-N type transistor T1 (via emitter 96 and collector 98), conductor 92, and normally open contact K1–2 of relay K1 when this contact is closed. When relays K1 and K3 are actuated, contacts K1–2, K3–3 and K3–6 are closed, contacts K3–4 and K3–5 are open, and motor M is energized to cause movement of slide 24 to the right, as viewed in FIG. 1, and to move the reed 15 towards and into contact with reed 14. Conversely, when relay K3 is non-actuated while relay K1 is actuated, as described hereinafter, contacts K1–2, K3–5 and K3–4 are closed, contacts K3–6 and K3–3 are open, and when transistor T1 is conducting, motor M is operated in the reverse direction to cause separation of reeds 14 and 15.

Transistor T1 conducts only when its base 94 and collector 98 are positive with respect to its emitter 96. This condition occurs, as described hereinafter, when relay K1 is actuated, relay K3 is non-actuated, and when transistor T2 (described hereinafter) is not conducting. Under such conditions, contacts K1–2, K3–5 and K3–4 are closed, and contacts K3–3 and K3–6 are open. The base 94 and collector 98 of transistor T1 are thus connected to positive line 84 through closed contact K1–2. This causes conduction of transistor T1. Motor M is thus operated in a direction to move reed 15 away from reed 14. Resistor R1 connected between base 94 and conductor 92 is a current limiting resistor.

Means are provided for discontinuing rotation of the armature of motor M to stop the movement of slide 24 when the reeds are spaced apart the desired amount. This means includes N-P-N type transistor T2. The collector 100 of transistor T2 is connected directly to the base 94 of transistor T1, and the emitter 102 of transistor T2 is connected directly to ground. The base 104 of transistor T2 is connected through normally open contact K1–4 of relay K1, when closed, through normally closed contact K3–9 of relay K3, and through current limiting resistor R2 to the output of a D.C. amplifier A. Transistor T2 is biased in non-conducting condition by biasing source 105 and resistor R3 connected between the base 104 of transistor T2 and ground. The output of the amplifier A varies from negative to positive voltages (as described hereinafter) and while the output is negative, transistor T2 is cut off. When the output of amplifier A swings sufficiently positive, and when relay K1 is actuated and relay K3 non-actuated, as described hereinafter, contacts K3–9 and K1–4 are closed, and transistor T2 conducts at its saturation level. Since the voltage drop between the collector and emitter of a transistor is small when the transistor is conducting at its saturation level, as known, the base 94 of transistor T1 is effectively shorted to ground when transistor T2 conducts at its saturation level and transistor T1 is thus cut off. Cutting off transistor T1 opens the power source to motor M and de-energizes the motor.

For providing dynamic and rapid braking of motor M, a diode D is connected between the emitter 96 and base 94 of transistor T1, the anode 108 of the diode D being connected to conductor 90 and the cathode 110 of the diode being connected to the base 94 of transistor T1 and to collector 100 of transistor T2. As described hereinafter, at the time transistor T2 operates to cut off transistor T1 for de-energizing motor M, relay K3 is not energized, contacts K3–3 and K3–6 are open, and contacts K3–4 and K3–5 are closed. Due to inertia, rotation of the motor armature does not immediately cease when power to the motor is cut off and the motor acts as a generator with the armature winding terminal 88 positive with respect to the armature winding terminal 80. Diode D then conducts and the armature winding of motor M is short circuited in a circuit consisting of closed contact K3–4 to ground, closed contact K3–5, conducting diode D, conducting transistor T2, and conductor 112 to ground. Shorting of the winding of a motor causes dynamic and rapid braking of the motor.

A further means is provided for energizing motor M to operate it in a direction to cause separation of the reeds. Such means comprise a manually operated switch 116 spring biased in normally open position. Switch 116 connects the positive power line 84 to terminal 88 of motor M through the coil of relay K4, and through normally closed contact K3–5 of relay K3. When relays K1 and K3 are non-actuated and contacts K1–3, K3–5, and K3–4 are closed, motor M is energized by closing switch 116.

For energizing the apparatus, a start button 120 is provided which has a pair of spring-biased contacts 122 and 124. Contact 122 is biased normally open and contact 124 is biased normally closed. Contact 122 is connected in series with the coil of relay K3 between power lines 84 and 86. A normally open contact K3–1 of relay K3 and a normally closed contact K2–1 of a relay K2 are connected from power line 84 to conductor 126 between contact 122 of switch 120 and relay K3. Contact 124 is connected between power lines 84 and 86 in series with (a) normally closed contact K4–1 of relay K4 and the coil of relay K1, and (b) the parallel circuit of normally open contacts K1–1 and K3–2 of relays K1 and K3, respectively.

When start button 120 is pushed, relay K3 is energized and contact K3–1 is closed. When start button 120 is released, relay K3 remains energized until relay K2 is energized and opens contact K2–1. When the start button is released, contact 124 closes, and since K3–2 is now closed, relay K1 is energized through normally closed contact K4–1. Relay K1 is maintained energized through closed contact K1–1 until relay K4 is energized and opens contact K4–1.

When relays K1 and K3 are energized, contacts K1–2, K3–3, and K3–6 close, contacts K3–4 and K3–5 open, and motor M is energized to move slide 24 in the reed closing direction.

After the reeds 14 and 15 are brought into electrical contact with each other, the direction of rotation of the armature of the motor is reversed to move reed 15 the desired distance from reed 14. As mentioned, each clamp 20 and 26 (FIGS. 1 and 2), and reeds 14 and 15, are electrically conductive, and clamps 20, 26 are electrically insulated from one another except through reeds 14, 15. Reeds 14 and 15 are connected in series with the coil of relay K5 between power lines 84 and 86. Normally open contact K5–1 of relay K5 is in series with normally open contact K3–8 of relay K3 and the coil of relay K2 between the power lines 84 and 86. When reeds 14 and 15 make electrical contact, relay K5 is energized thereby closing contact K5–1. Since contact K3–8 is closed at this time, relay K2 is energized. When relay K2 is energized, contact K2–1 is opened thereby de-energizing relay K3. Relay K1 remains energized. De-energizing relay K3 causes contacts K3–3 and K3–6 to open and contacts K3–4 and K3–5 to close. Transistor T1 is thus energized and conducts. The voltage across motor M is thus reversed and the armature of motor M thereafter rotates in a direction to cause separation of the reeds. Although contacts K1–4 and K3–9 are closed at this time, transistor T2 does not conduct because the output of amplifier A is negative as described hereinafter.

After the reeds have been separated the proper distance by motor M, the motor is de-energized and dynamically braked to hold the reeds in proper spaced apart relation. Means for accomplishing this are as follows.

As mentioned, movable slide 24 is connected to the armature of a differential transformer DT, the D.C. output voltage of which is directly proportional to the amount of movement of the slide. A source of power 130 is connected to the input terminals of the differential transformer DT. The differential transformer DT is so connected that the output of the differential transformer becomes increasingly positive as the slide is moved in a direction to separate the reeds. One output terminal of the differential transformer is connected to ground and the other output terminal is connected to one terminal of a capacitor C. The other terminal of capacitor C is connected to a manually adjusted voltage source V which is connected to the input terminal of the D.C. amplifier A. Connected between capacitor C and voltage source V is a conductor 134 which is connected to ground through normally closed contact K3–7 of the relay K3 and normally open contact K5–1 of the relay K5, when closed.

Details of the voltage source V and the D.C. amplifier A are not shown since such devices are well known. Preferably, however, the voltage source V is continuously adjustable and has a stable output. As shown, the voltage source V is so connected that its polarity is opposite to the output voltage of the differential transformer DT.

The D.C. amplifier preferably has a high gain in the order of 1000 or more, a substantially infinitely high input impedance, good stability, and an output voltage exactly in phase with its input voltage. Also, in the desired operating range of the amplifier A, the gain should be relatively constant, but should preferably level off rapidly outside the operating range. That is, the amplifier output should have a clipping characteristic for high input voltages. The reason for this appears hereinafter.

The input voltage to the D.C. amplifier A is the sum of the voltages of the voltage source V, the capacitor C, and the D.C. output of the differential transformer DT. As described hereinafter, the voltage of source V is adjusted so that the input to the amplifier A is negative until slide 24 has moved reed 15 to a position where it is spaced almost the finally desired distance from reed 14.

As mentioned, when the apparatus is first energized, motor M operates to move reed 15 towards and into contact with reed 14. When the reeds 14 and 15 come together and make electrical contact, relay K5 is energized with the result, as previously described, that relay K3 is de-energized, contacts K5–1 and K3–7 are closed, and contact K3–8 is opened. At this time, capacitor C charges through contacts K3–7 and K5–1 to the output voltage of the differential transformer, but with reverse polarity. Thereafter, the reeds begin to separate due to the reversal of the power supply voltage across motor M, as described. While the reeds are in electrical contact with one another the voltage across capacitor C follows or charges to the output voltage of differential transformer DT, which varies with movement of slide 24. When reeds 14 and 15 separate, however, relay K5 is de-energized, contact K5–1 opens, and the voltage on capacitor C is held without change. That is, since amplifier A has a substantially infinite input impedance, and contacts K5–1 and K3–8 are open, capacitor C can thereafter neither charge nor discharge. The fixed voltage on capacitor C is equal to, but opposite in polarity, the output voltage of the differential transformer DT at the instant reeds 14 and 15 first break electrical contact. The output of the differential transformer continues to increase with continued movement of slide 24.

The input to the amplifier A, as mentioned, is the sum of the output voltage of the differential transformer DT, the voltage across capacitor C, and the fixed voltage produced by the voltage source V. While the reeds are in contact, the input voltage to the amplifier A is equal to the voltage of source V. When the reeds first break contact and when capacitor C is prevented from further charging or discharging, the increase in the output voltage of the differential transformer DT opposes the voltage of source V and causes the input voltage to the amplifier A to become less negative. The change in the input to amplifier A is thus directly proportional to the movement of reed 15 away from the point where electrical contact between the reeds is first broken. The increase in the differential transformer output voltage over the output voltage at the time the reeds 14 and 15 first break electrical contact is hereinafter referred to as the incremental voltage.

Until the incremental voltage equals the source V voltage, the input to the D.C. amplifier is negative and the output is negative. Due to the high gain of the D.C. amplifier, almost immediately after the input to the amplifier reaches zero and becomes positive, the output voltage from the amplifier is sufficiently positive to cause transistor T2 to conduct at its saturation level and de-energize and brake motor M, as described. Some advantages of this arrangement are described hereinafter.

A method of operation of the apparatus described is as follows: At the beginning of a cycle, the burner assembly 55 is positioned to the right as viewed in FIG. 2. Chucks 28 and 30 have been removed from clamps 20 and 26 and reeds 14 and 15 are inserted in the openings 38 therein. Openings 38 are provided with stops therein (not shown) whereby the length of the reeds extending outwardly of chucks 28 and 30 is fixed. Further, the openings 38 are rectangular in cross section so that the flattened reeds 14 and 15 which are rectangular in cross section are properly angularly oriented with respect to one another. The glass tubing 65 is clipped in place on support 52. Slide 24 at this time is well to the left as viewed in FIG. 1 to dispose clamp 26 to the left of and out of registry with clamp 20. This is to prevent axial or butting engagement of the reeds 14 and 15 with each other when the reeds are first mounted on the apparatus. Chucks 28 and 30 are then inserted into clamps 20 and 26 through the top and bottom thereof, respectively, and clamped in place by screws 34. Within glass tubing 65 the reeds are disposed in face-to-face overlapping and spaced apart relation. Thereafter, the gap between the reeds is set.

The operator pushes and releases button 120 (FIG. 8) thereby energizing relays K3 and K1, in that order, and actuating all the contacts controlled by these relays. Although slide 24 is positioned well to the left, as viewed in FIG. 1, thereby causing differential transformer DT to produce a relatively large positive output voltage, the clipping characteristic of amplifier A prevents the output of the amplifier from reaching excessively high voltages. Transistor T2 does not conduct at this time since contact K3–9 is open.

When relays K1 and K3 are energized, contacts K1–2, K3–3, and K3–6 are closed, contacts K3–5 and K3–4 are opened, and motor M is thus energized to move slide 24 in the reed closing direction. When the reeds come into electrical contact, relay K5 is energized.

When relay K5 is energized, contact K5–1 closes thereby energizing relay K2, which in turn, opens contact K2–1 which de-energized relay K3. One result of this is that the polarity of the voltage across motor M is reversed and the motor armature is rotated in the opposite direction to move slide 24 in the reed separating direction, as described. Another result is that capacitor C charges to the output voltage of the differential transformer, but with reverse polarity. Until the reeds separate, changes in the differential transformer output voltage cause corresponding changes in the voltage of capacitor C. When reeds 14 and 15 separate, relay K5 is de-energized, contact K5–1 opens and further charging or discharging of the capacitor is prevented. The changing D.C. input voltage to the amplifier A is thereafter directly proportional to the increase in spacing between the reeds from the point where the reeds first break electrical contact, as described.

The voltage source V is adjusted so that the magnitude of its voltage is equal to that incremental voltage produced by the differential transformer DT which would be caused by an amount of movement of slide 24 almost equal to the desired final spacing between the reeds. When slide 24 has moved a distance sufficient to cause differential transformer DT to produce an incremental voltage slightly greater than the voltage source V voltage, the input to amplifier A becomes positive. Because of the large gain of amplifier A, only a small positive input voltage is required to produce an amplifier output voltage sufficiently large to cause transistor T2 to conduct at its saturation level.

Conduction of transistor T2, as described, shorts out the base voltage of transistor T1 thereby de-energizing the armature winding of motor M and causing dynamic braking of the motor, as described.

Due to many factors, such as variations in the speed of operation of the various relays, in the speed of rotation of the armature of motor M, in the voltage at which transistor T2 will conduct and reach its saturation level, and variations in the gain of amplifier A, the distance that slide 24 moves after the amplifier input voltage first becomes positive may vary from day to day. Therefore, the voltage of source V is preferably varied at the start of each day's run by trial and error processes in order to arrive at operating conditions which result in slide 24 stopping when the reeds are at the desired spacing.

The reason the D.C. amplifier preferably has such a large gain is that it greatly reduces the reed spacing error resulting from variations in the gain of the amplifier or variations in the conducting voltage of transistor T2.

For example, for a differential transformer which produces an output voltage of 1 volt for an armature movement of 0.03 inch, and an amplifier having a gain of 1000, the amplifier output will be 1 volt for each 0.00003 (three one hundred thousandths) inch movement of slide 24. Thus, for a transistor T2 that normally reaches its saturation level at a base to emitter voltage of 1 volt, variations in the transistor which cause it to reach its saturation level at 0.8 volt results in a maximum error of only 0.000006 (six millionths) inch in the movement of slide 24. Likewise, variations in the gain of the amplifier will have little effect on the reed spacing accuracy.

The voltage source V may be omitted and transistor T2 biased to conduct when the amplifier A output reaches a preselected positive voltage. However, it is preferred to use the source V because for a differential transformer and amplifier having the characteristics described above, and a desired reed spacing of 3 mils, the input voltage to the amplifier will be 0.1 volt when the reeds are spaced apart 3 mils. The output of the amplifier, in such case, without source V, will be 100 volts. For accuracy, therefore, the amplifier should have a constant gain between zero and 100 volts output. As known, this is difficult to achieve and requires accurate high voltage bias sources which are undesirable for reasons of expense.

Further, by arranging to have transistor T2 conduct with an amplifier A input voltage near ground potential, balancing of the amplifier to correct for drift is greatly simplified.

For example, for a differential transformer and amplifier having the characteristics described above, the input voltage required to produce an amplifier output voltage of 1.0 volt required to cause saturation conduction of transistor T2 is only 1.0 millivolts. Thus the operating range of the amplifier at which the transistor T2 is caused to conduct is close to ground potential at which the amplifier is conveniently calibrated to correct for drift.

After the gap has been set, the purging gas is supplied through hose 39, through opening 38 in chuck 30, and through tubing 65 for purging the atmospheric gases from tubing 65. Due to the presence of shield 40 and the spacing between the lower end 72 of glass tubing 65 from the upper end of chuck 30, the purging gas is directed to flow upwardly through shield 40 and also along the outside surface of glass tubing 65 for reasons to be described.

Thereafter, the ends of glass tubing 65 are sealed about reeds 14 and 15 passing therethrough. To accomplish the sealing operation, the burner assembly 55 is moved to the left, as viewed in FIG. 2, until the ends 70 and 72 of the tube 65 are centered in burners 57 and 58 as shown in FIG. 3. Burner 57 has a hotter flame than burner 58 and quickly seals the top end 70 of tube 65 onto and around reed 14. During this time the purging gas is directed by shield 40 onto the lower portion of glass tubing 65 heated by lower burner 58. The purging gas cools the lower end of the glass tubing thereby causing the sealing of the lower end of tubing 65 to proceed at a slower rate than the sealing of the upper end. During this time, the purging gas also flows upwardly and into tubing 65, and upon sealing of the upper end 70 thereof, the purging gas is trapped within glass tubing 65. Thereafter, burner 57 is moved to the right, as viewed in FIG. 2, and the upper seal and reed 14 are allowed to cool.

As shown in FIGS. 3 and 6, lower burner 58 is disposed about tube 65 at a position spaced from the lower end 72 thereof, which end 72 is received within shield 40. Shield 40 prevents the products of combustion from the flame from burner 58 from entering the reed switch through the lower end 72 of tubing 65. It has been found that if such products of combustion enter the reed switch and are sealed therein, the operating characteristics of the reed switch may be adversely affected.

Shortly after the upper seal has cooled, the heated region at the lower end of tubing 65 collapses onto and hermetically seals the bottom of tubing 65 as shown in FIG. 6. Thereafter, the flow of the purging gas is shut off. End 72 of glass tubing 65 is no longer cooled by the flow of the purging gas and the temperature of the glass and reed 15 therethrough increases and causes the lower skirt 72 to "ball up" at the lower end 72 of tubing 65 as shown in FIG. 7. Thereafter burner 58 is removed, and the molten glass cools and seals around reed 15.

After sealing, chucks 28 and 30 and the completed switch are removed from the aparatus. Switch 116 (FIG. 8) is then closed by the operator to energize motor M through the coil of relay K4, and contacts K3-5 and K3-4. Motor M operates to move chuck 30 to the left, as viewed in FIG. 1, to ready the apparatus for the next cycle of operations.

When switch 116 is closed, relay K4 is energized thereby opening contact K4-1 and de-energizing relay K1. The full cycle of operations is thus completed.

What is claimed is:

1. Apparatus for automatically setting the gap between a pair of conductive elements comprising:
    means for moving one of said elements towards and into electrical contact with the other of said elements, and for moving said one element away from said other element,
    means connected to said one element for producing a D.C. signal dependent on the position of said one element,
    a capacitor coupled to said signal producing means,
    means for charging said capacitor to said D.C. signal but with opposite polarity when said elements are moved into electrical contact, and for substantially preventing discharge of said capacitor after said elements are moved apart, and
    means connected to said moving means and responsive to the sum of said signal across said capacitor and said position dependent signal for stopping said moving means when the sum of said signals reaches a preselected value to provide a preselected spacing between said elements.

2. Apparatus for automatically setting the gap between a pair of conductive elements comprising:
    a stationary chuck adapted to hold one of said elements,
    a movable chuck adapted to hold the other of said elements, said elements being held in parallel overlapped relation by said chucks,
    means for moving said movable chuck relative to said stationary chuck to move said elements toward and into contact with each other and away from each other,
    means connected to said movable chuck for producing a D.C. voltage signal proportional to the position of said movable chuck,
    control means connected to said moving means and operable to discontinue movement of said movable chuck, said control means being connected to said signal producing means,
    a capacitor coupled between said signal producing means and said control means, and
    means for charging said capacitor to said D.C. signal but with opposite polarity when said elements are moved into electrical contact, and for substantially preventing discharge of said capacitor after electrical contact between said elements is broken,
    said control means being actuated for discontinuing movement of said movable chuck in response to a preselected sum of the voltage across said capacitor and the D.C. voltage signal of said signal producing means, for providing a preslceted spacing between said elements.

3. Apparatus for automatically setting the gap between a pair of conductive elements comprising:
    a stationary chuck adapted to hold one of said elements,
    a movable chuck adapted to hold the other of said elements, said elements being held in parallel overlapped relation by said chucks,
    means for moving said movable chuck relative to said stationary chuck for bringing said elements into electrical contact,
    means responsive to electrical contact between said elements for causing said moving means to move said movable chuck relative to said stationary chuck for separating said elements,
    means connected to said movable chuck for producing a D.C. voltage signal proportional to the position of said movable chuck,
    control means connected to said moving means and operable to discontinue said separating movement of said movable chuck, said control means being connected to said signal producing means, a capacitor coupled between said signal producing means and said control means, means for charging said capacitor to said D.C. signal but with opposite polarity when said elements are moved into electrical contact, and for substantially preventing discharge of said capacitor after electrical contact between said elements is broken, and biasing voltage means opposite in polarity to said D.C. signal connected between said capacitor and said control means, said control means being actuated for discontinuing movement of said movable chuck when the sum of the voltage across said capacitor and the D.C. voltage signal of said signal producing means is substantially equal to said biasing voltage, for providing a preselected spacing between said elements.

4. Apparatus for automatically setting the gap between a pair of conductive elements comprising:

a stationary chuck adapted to hold one of said elements, a movable chuck adapted to hold the other of said elements, said elements being held in parallel overlapped relation by said chucks, a motor for moving said movable chuck relative to said stationary chuck to move said elements toward and into contact with each other and away from each other, a differential transformer having an armature, said movable chuck being connected to said armature whereby the output voltage of said differential transformer is proportional to the position of said movable chuck, control means connected to said motor, said control means having input terminals and being operable to stop said motor, said control means having substantially infinite input impedance, a capacitor having one terminal connected to one input terminal of said control means and another terminal connected to said differential transformer, a normally open contact connected between said one terminal of said capacitor and the other of said input terminals of said control means, and means responsive to electrical contact of said elements with one another for closing said contact, and for opening said contact when electrical contact between said elements is broken, said control means stopping operation of said motor in response to a preselected sum of the voltage across said capacitor and the output voltage of said differential transformer.

5. Apparatus for automatically setting the gap between a pair of conductive elements comprising:

a fixed chuck adapted to hold one of said elements, a movable chuck adapted to hold the other of said elements, said elements being held in parallel overlapped relation by said chucks, a motor for moving said movable chuck towards and away from said fixed chuck, means for causing said motor to move said movable chuck towards said fixed chuck, means responsive to electrical contact between said elements for causing said motor to move said movable chuck away from said fixed chuck, a differential transformer having an armature connected to said movable chuck, said differential transformer providing a D.C. signal proportional to the position of said movable chuck, control means connected to said motor, said control means having input terminals and being operable to discontinue operation of said motor, said control means having substantially infinite input impedance, a capacitor and a biasing voltage connected in series, one terminal of said capacitor being connected to said differential transformer and one terminal of said biasing voltage means being connected to one input terminal of said control means, said voltage means being connnected opposite in polarity to said D.C. signal, a normally open contact connected between the other terminal of said capacitor and the other input terminal of said control means, and means responsive to electrical contact of said elements with one another for closing said contact, and for opening said contact when electrical contact between said elements is broken, said control means being actuated to stop said motor when the sum of the voltage across said capacitor and the output voltage of said differential transformer is substantially equal to said biasing voltage.

References Cited by the Examiner

UNITED STATES PATENTS 2,940,036   6/1960   Weeks _____ 324—28

WALTER L. CARLSON, *Primary Examiner.*

G. L. LETT, *Assistant Examiner.*